(12) United States Patent
DeFelice et al.

(10) Patent No.: US 9,937,667 B2
(45) Date of Patent: Apr. 10, 2018

(54) METHOD FOR ANALYTICALLY DETERMINING SLS BED TEMPERATURES

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 630 days.

(21) Appl. No.: 14/472,817

(22) Filed: Aug. 29, 2014

(65) Prior Publication Data

US 2015/0061195 A1 Mar. 5, 2015

Related U.S. Application Data

(60) Provisional application No. 61/871,412, filed on Aug. 29, 2013.

(51) Int. Cl.
*B29C 67/00* (2017.01)
*C08L 71/00* (2006.01)
(Continued)

(52) U.S. Cl.
CPC ........ *B29C 67/0088* (2013.01); *B29C 64/153* (2017.08); *B29C 64/386* (2017.08);
(Continued)

(58) Field of Classification Search
CPC .......................... B29C 67/0088; B29C 67/0077
(Continued)

(56) References Cited

U.S. PATENT DOCUMENTS 5,182,715 A * 1/1993 Vorgitch ............. B29C 67/0066
264/401
6,066,285 A * 5/2000 Kumar ................. G03G 15/224
264/317
(Continued)

FOREIGN PATENT DOCUMENTS

WO 2013090174 A1 6/2013

OTHER PUBLICATIONS

International Search Report and Written Opinion of the International Searching Authority Application No. PCT/US2014/053412 Completed: Oct. 24, 2014; dated Nov. 12, 2014 7 pages.
(Continued)

*Primary Examiner* — Christina Johnson
*Assistant Examiner* — Xue Liu
(74) *Attorney, Agent, or Firm* — Whitmyer IP Group LLC (57) ABSTRACT

A method for determining a bed temperature setpoint for use with a powder in a selective laser sintering machine is disclosed. The method includes the step of providing a powder comprising a polymer for use in a selective laser sintering machine. The method further includes the step of determining a ratio of a liquid portion of the powder to a solid portion of the powder as a function of temperature within a temperature range. A bed temperature setpoint is selected in the temperature range corresponding to a desired ratio of the liquid portion of the powder to the solid portion of the powder. A temperature of a bed of a selective laser sintering machine is set to the selected bed temperature setpoint, and a part is built from the powder using the selective laser sintering machine.

11 Claims, 3 Drawing Sheets

(51) Int. Cl.
*B29C 64/153* (2017.01)
*B29C 64/386* (2017.01)
*B29K 105/00* (2006.01)
*B29K 71/00* (2006.01)
*B33Y 50/02* (2015.01)

(52) U.S. Cl.
CPC .......... *C08L 71/00* (2013.01); *B29K 2071/00* (2013.01); *B29K 2105/251* (2013.01); *B33Y 50/02* (2014.12); *C08G 2650/40* (2013.01)

(58) Field of Classification Search
USPC .......................................................... 264/497
See application file for complete search history.

(56) References Cited

U.S. PATENT DOCUMENTS

| | | | |
|---|---|---|---|
| 6,905,645 B2 * | 6/2005 | Iskra .................... | B22F 3/1055 264/128 |
| 6,930,278 B1 * | 8/2005 | Chung .................. | B23K 26/34 219/121.83 |
| 2009/0206065 A1 | 8/2009 | Kruth et al. | |
| 2013/0216836 A1 | 8/2013 | Grebe et al. | |
| 2013/0217838 A1 | 8/2013 | DeFelice et al. | |

OTHER PUBLICATIONS

Kurtz, et al.; "PEEK Biomaterials in Trauma, Orthopedic, and Spinal Implants"; Biomaterials 28 (2007) 4845-4869.

C. Yan et al.: "Investigation into the Differences in the Selective Laser Sintering between Amorphous and Semi-crystalline Polymers" International Polymer Processing, vol. 26, No. 4 Published: Sep. 1, 2011 10 Pages.

Extended European Search Report Application No. 14839498.4 Completed: Apr. 6, 2017; dated Apr. 18, 2017 5 Pages.

* cited by examiner

METHOD FOR ANALYTICALLY DETERMINING SLS BED TEMPERATURES

FIELD OF THE INVENTION

The present disclosure relates to a system and method for processing polymer resins. More specifically, the present disclosure relates to a system and method for determining a bed temperature setpoint for a selective laser sintering (SLS) machine for use with a polymer powder, including polyaryletherketones ("PAEK").

BACKGROUND OF THE INVENTION

Selective laser sintering ("SLS") is an additive manufacturing technique that uses electromagnetic radiation, for example from a laser, to fuse small particles of plastic, metal (direct metal laser sintering), ceramic, or glass powders into a mass having a desired three dimensional shape. The laser selectively fuses powdered material by scanning cross-sections generated from a three dimensional digital description of the part on the surface of bed having a layer of the powdered material disposed thereon. After a cross-section is scanned, the bed is lowered by one layer thickness, a new layer of powdered material is disposed on the bed, and the bed is rescanned by the laser. This process is repeated until the build is completed.

Prior to scanning, an SLS machine typically preheats the powder material disposed on the bed to a temperature proximate to a melting point of the powder. Preheating is typically accomplished by heating the actual bed, which transfers energy to the powder in the form of heat via thermal conduction. Preheating the powder makes it easier for the laser to raise the temperature of powder to a fusing point.

When working with certain material in the SLS process, for example polymer powders, the bed temperature is set to a temperature specific to the polymer resin in use. This specified temperature is typically proximate to the melting point of the polymer resin. The laser causes fusion of the powder in locations specified by the build input. Laser energy exposure is typically selected based on the polymer in use and is between the amount required to fuse the resin and the amount that will cause degradation. Preheating of the material inhibits unwanted distortions in formed parts during cooling.

After the layer-wise process is completed, the formed object(s) is disposed in a volume of unfused powder, referred to as a cake. The formed object(s) is extracted from the cake. The powder from the cake that is not fused into the built part can be recovered, sieved, and used in a subsequent SLS build.

Polyaryletherketones ("PAEK") are of interest in the SLS process because parts that have been sintered from PAEK powder are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group of polyetheretherketone ("PEEK"), polyetherketone ketone ("PEKK"), polyetherketone ("PEK"), polyetheretherketoneketone ("PEEKK"), or polyetherketoneetherketoneketone ("PEKEKK").

The bed temperature setpoint may be determined, for example, by referring to a temperature setpoint published by a vendor of the powder. In such circumstances, the operator sets the SLS bed temperature to the setpoint specified by the vendor and commences the SLS build process when the bed has achieved the setpoint temperature.

A disadvantage of relying on a bed temperature setpoint specified by a vendor is that the melting point of the powder may vary between different lots of powder. This is true even if between different lots of the same type of powder. As a result, the temperature setpoint specified by the vendor may be incorrect for the actual lot of powder being used in the build.

Another disadvantage of relying on a bed temperature setpoint specified by a vendor is that the vendor provides a setpoint for a lot of pure powder. Typically, a vendor does not provide a bed temperature setpoint for a lot subsequently prepared by the operator by, for example, combining two or more types of powder, for example two different polymers. Similarly, a vendor typically does not provide a bed temperature setpoint for a powder having one or more fillers.

Another disadvantage of relying on a bed temperature setpoint specified by a vendor is that a melting point of unused powders versus a melting point for recycled powders can vary dramatically. As a result, it is necessary to use different bed temperature setpoints depending on whether an SLS powder lot consists of unused powder, first recycle powder, second recycle powder, or some combination thereof. For example, as disclosed in U.S. application Ser. No. 13/705,332 to DeFelice et al., the difference between the bed temperature setpoint for unused PEKK powder and first recycle PEKK powder is fifteen degrees Celsius. The '332 application to DeFelice is hereby incorporated by reference.

Another disadvantage of relying on a bed temperature setpoint specified by a vendor is that certain polymer powders, for example PEKK, are copolymers. A copolymer comprises two (or more) monomeric species. For example, PEKK is a copolymer (AB type EKK/EKK). In lots of such copolymers, the ratio of a first species compared to a second species may be varied to achieve, for example, blends having different ratios. A problem with such copolymers is that the temperature at which fusing initiates may vary based on the ratio of the first species relative to the second species, thus making it difficult to select a correct bed temperature setpoint.

As a result of these disadvantages associated with bed temperature setpoints specified by a vendor, incorrect bed temperature setpoints are often used in SLS runs. An incorrect bed temperature may results in serious structural problems in the part formed during the SLS procedure. For example, if the bed temperature setpoint is too low, the built part may become distorted relative to the desired three-dimensional shape. If this happens, the built part may be discarded, or it may require additional man hours to further shape the part so that it conforms to the desired three-dimensional shape, to the extent reshaping is feasible.

If, on the other hand, the bed temperature setpoint is too high, the powder may began to melt or fuse prior to being sintered in the layer wise fashion. This can result in a built part with substantial structural flaws, and, if the bed temperature setpoint is above a certain temperature setpoint it may prevent formation of a three-dimensional part from during the SLS process because successive layers will not fuse together.

It is known to overcome the problems associated with reliance on a bed temperature setpoint specified by a vendor by observing properties of a powder in an SLS machine during a warmup cycle. In this observation method, a layer of powder is disposed on a bed at a temperature well below the melting point of the disposed powder, for example room temperature. The bed temperature is then increased and an operator visually observes the powder on the bed for certain visual cues that indicate the onset of fusion, or that indicate that fusion is imminent. For example the color of the powder and the texture of the powder may shift, indicating that the layer of powder is beginning to fuse. When these visual cues are observed, the operator notes the temperature of the bed. The bed temperature setpoint for the lot being visually tested is typically between five to eleven degrees Celsius below the temperature at which the layer of powder begins to fuse.

A disadvantage of the above described observation method is that it relies of the visual acuity of the operator conducting the calibration. As a result, and due to differences between different operators, an operator may select a bed temperature set point that is too high or too low.

Another disadvantage of this method is that certain environmental factors, for example the type and intensity of lighting proximate to the bed may also affect the visual observations made by the operator. It has been found that the structural properties for sintered powders can be statistically affected by shifts of as little as a single degree Celsius.

It is an object of the present invention to overcome these disadvantages and other disadvantages associated with the prior art.

SUMMARY OF THE INVENTION

It is an object of the present invention to provide method and system for analytically determining the bed temperature set point in a SLS machine which avoids the problems associated with the known systems and methods.

These and other objects of the present invention are achieved by provision of a method for determining a bed temperature setpoint for use with a powder in a selective laser sintering machine. The method includes the steps of providing a powder comprising a polymer for use in a selective laser sintering machine. The method further includes the step of determining a ratio of a liquid portion of the powder to a solid portion of the powder as a function of temperature within a temperature range. The method further includes the step of selecting a bed temperature setpoint in the temperature range corresponding to a desired ratio of the liquid portion of the powder to the solid portion of the powder.

In yet other embodiments of the present invention, the method includes the step of providing a selective laser sintering machine having a bed with a variable temperature control. The method further includes the step of setting a temperature of the bed to the selected bed temperature setpoint. The method further includes the step of building a part from the powder using the selective laser sintering machine.

In further embodiments of the present invention, the method includes the step of determining a melt curve for the powder in the temperature range. The melt curve represents the energy required to increase the temperature of the powder in the temperature range.

In yet a further embodiment of the present invention the method includes the step of using differential scanning calorimetry to determine the melt curve for the powder.

In yet a further embodiment of the present invention, the method includes the step of determining the ratio of the liquid portion of the powder to the solid portion of the powder as a function of temperature based on the melt curve.

In yet another embodiment of the present invention, the method includes the step of selecting the desired ratio by referencing a library comprising data associated with a plurality of parts made using a standard powder with a selective laser sintering machine, each said part being made using a different bed temperature setpoint, each bed temperature setpoint corresponding to a different ratio of a liquid portion of the powder to a solid portion of the powder. In yet a further embodiment of the present invention, the standard powder comprises a polymer, and the standard powder is different than the powder for which the desired ratio is being selected.

In yet a further embodiment of the present invention, the library comprises accuracy data corresponding to an accuracy of the part relative to a design used to make the part. In yet a further embodiment of the present invention, the library comprises removal data corresponding to the ease or difficulty of removing the part from a powder cake surrounding the part.

In yet another aspect of the present invention the powder comprising one or more of polyetheretherketone ("PEEK"), polyetherketone ketone ("PEKK"), polyetherketone ("PEK"), polyetheretherketoneketone ("PEEKK"), or polyetherketoneetherketoneketone ("PEKEKK"). In some embodiments of the present invention, the powder comprises PEKK. In yet further embodiments of the present invention, the powder comprises recycled PEKK. In yet further embodiments, the powder comprises virgin PEKK.

DETAILED DESCRIPTION OF THE INVENTION

The inventors have discovered new methods and systems to overcome the problems associated with the prior art. Specifically, the inventors have discovered a method and system to define the bed temperature setpoint for a specific lot of powder. By employing analytical methods and systems to each lot of powder, and, in some cases, to each run of the SLS machine, it is possible to determine a more accurate bed temperature setpoint resulting in builds having more structural similarity and builds that have desired build properties.

In some embodiments of the present invention, the detailed melting behavior of a specific lot of powder is determined. Based on the results of this determination, the bed temperature setpoint is established.

In one embodiment of the present invention, a melt curve is determined for a lot of powder to be used in an SLS machine. Such a melt curve may be created, for example, by using differential scanning calorimetry ("DSC"). DSC is a thermoanalytical technique in which the difference in the amount of heat required to increase the temperature of a sample and reference is measured as a function of temperature. Both the sample and reference are maintained at nearly the same temperature throughout the analysis. In this way, it is possible to measure the amount of heat required to increase the temperature of the sample. Typically, differential scanning calorimetry is performed using a differential scanning calorimeter. DSC units are sold under the brand names Linseis Thermal Analysis, Mettler Toledo, Netzsch, Shimadzu, PerkinElmer, Setaram Instrumentation, and TA Instruments, among others.

Figure 1:
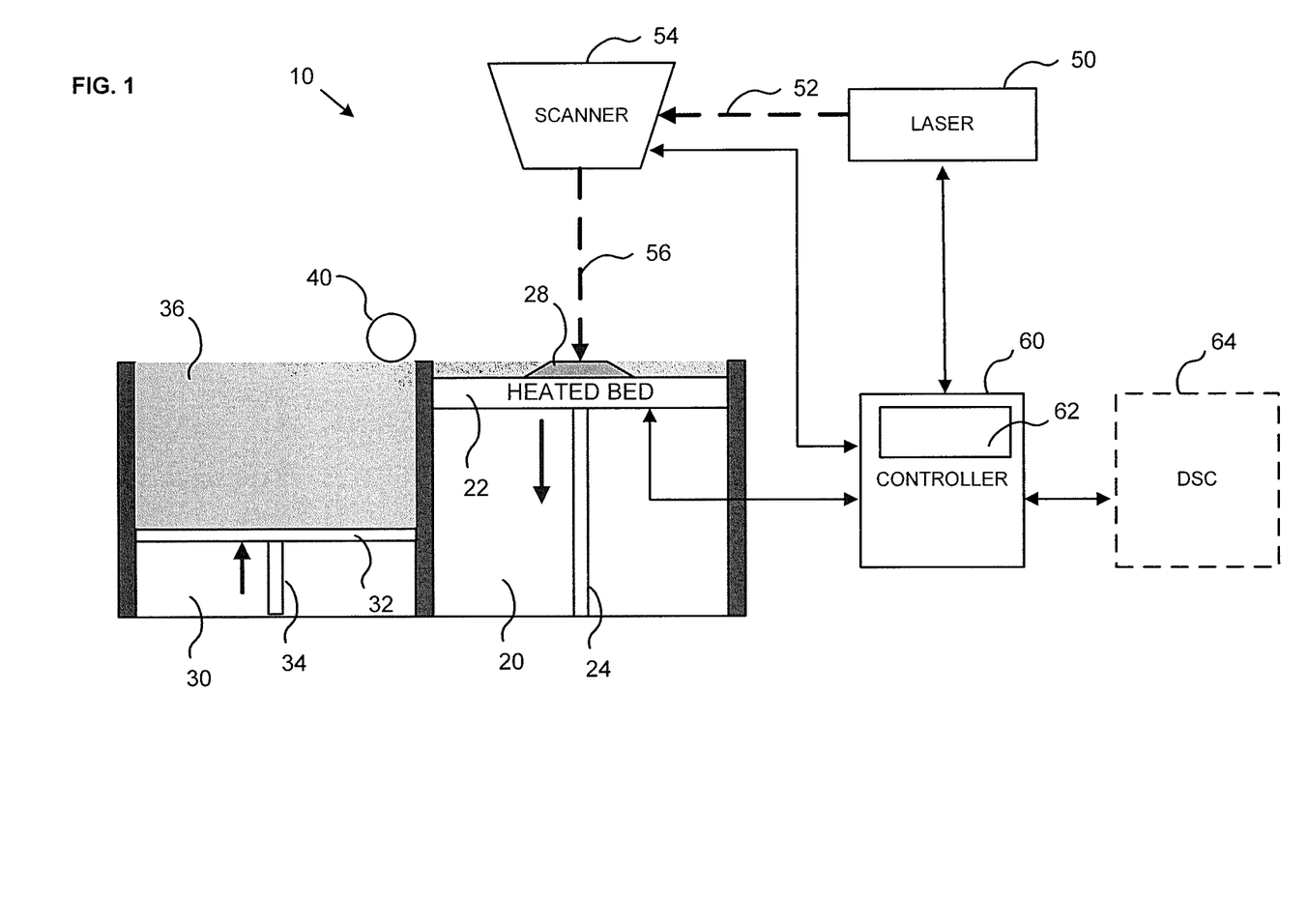
FIG. 1 illustrates an SLS machine in accordance with one embodiment of the present invention.

In reference to FIG. 1, an SLS machine 10 in accordance with the present invention is illustrated. The system 10 includes a first chamber 20 having an actuatable piston 24 disposed therein. A bed 22 is disposed at an end of the piston 24. The temperature of the bed 22 can be variably controlled via a controller 60 in communication with heating elements in and or around the bed 22. The bed temperature setpoint is input through an interface 62 into the controller 60. Software executing on the controller 60 transmits a signal to one or more heating elements heat the bed at or around the temperature setpoint. A second chamber 30 is adjacent to the first chamber 20. The second chamber 30 includes and includes a table surface 32 disposed on an end of a piston disposed therein. A powder 36 for use during in the SLS machine 10 is stored in the second chamber 30 prior to the sintering step.

During operation of the SLS machine 10, a spreader 40 translates across a top surface of the first chamber 20, evenly distributing a layer of powder 36 across either the top surface of the bed 22, or the material previously disposed on the bed. The SLS machine 10 preheats the powder material 26 disposed on the bed to a temperature proximate to a melting point of the powder. Preheating is typically accomplished by heating the actual bed, as described above, which transfers energy to the powder in the form of heat via thermal conduction. Preheating the powder makes it easier for the laser to raise the temperature of powder to a fusing point. In some embodiments of the present invention, there are also heating element in or around the second chamber in order to heat the powder prior to deliver to the sintering surface.

A laser 50 and a scanning device 54 are disposed above the bed. The laser transmits a beam 52 to the scanner 54, which then distributes a laser beam 56 across the layer of powder 36 disposed on the bed 22 in accordance with a build program. The laser selectively fuses powdered material by scanning cross-sections generated from a three dimensional digital description of the part on the surface of bed having a layer of the powdered material disposed thereon. The laser 50 and the scanner 54 are in communication with the controller 60. After a cross-section is scanned, the bed 22 is lowered by one layer thickness, a new layer of powdered material is disposed on the bed via the spreader 40, and the bed is rescanned by the laser. This process is repeated until the build 28 is completed. During this process, the cylinder 34 in the second chamber is incrementally raised to ensure that there is sufficient supply of powder.

DSC analysis is specifically useful, for example, in determining thermal transitions of polymers. In reference to FIG. 1, an optional differential scanning calorimeter 64 is shown in communication with the controller 60. By analyzing the powder for use in the SLS process using differential scanning calorimetry techniques, it is possible to analytically determine the bed temperature to achieve desired build properties. The DSC is shown in FIG. 1 in communication with the controller, however, a person of ordinary skill in the art and familiar with this disclosure will understand that there are many different configurations that can be implemented to practice the present invention. For example, the DSC may not be connected to the controller and a library of bed temperature setpoint is stored in the controller, and software executing on the controller determines a bed temperature setpoint based on the parameters of the type of powder being used in the machine.

Figure 2:
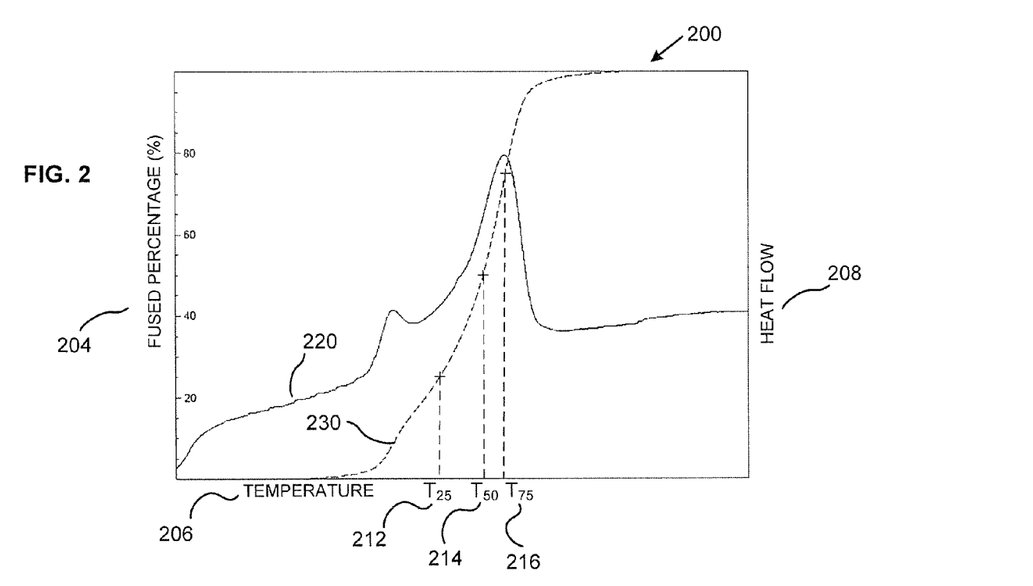
FIG. 2 illustrates a melt curve for a polymer powder for use in an SLS machine in accordance with one embodiment of the present invention.

In reference to FIG. 2, a chart 200 illustrating a melt curve 220 for a sample of 60/40 PEKK is shown. The melt curve 220 was created using a DSC device. The melt curve shows heat flow 208 versus temperature 206 for the 60/40 PEKK sample. The melt curve 220 illustrates the transition of the PEKK sample from a powder to a liquid during a temperature range. As the temperature increases the powder begins melting and finally becomes a liquid. Thus, during the illustrated range a portion of the powder is a solid and a portion of the powder is liquid. The thermal transition is illustrated in the DSC melt curve 220 by the peak areas in the melt curve 100. These peak curves are indicative of the fact that the polymer requires additional heat during this thermal transition period to increase its temperature relative to the standard employed in the DSC analysis. In determining a bed temperature setpoint using the DSC analysis, the operator typically selects a point on the curve 220 during the melt transition.

Superimposed on the melt curve 200 shown in FIG. 2 is a second curve 230 representing a ratio of a liquid portion of the powder to a solid portion of the powder as a function of temperature within the temperature range. The second curve 230 is based on the integration, i.e. the area under the curve, of the melt curve 220. Using this ratio 130 it is possible to select a bed temperature setpoint in the temperature range corresponding to a desired ratio of the liquid portion of the powder to the solid portion of the powder For example, FIG. 2 illustrates three points on the curve 230: 25% of the sample melted 212, 50% of the sample melted 214, and 75% of the sample melted 216. These points correspond to three different temperatures: $T_{25}$, $T_{50}$, and $T_{75}$. Thus at temperature $T_{25}$, 25% of the sample has melted. It should be understood that the references points are included on the chart shown in FIG. 2 for reference only, and that other melt percentages can be used.

It should be understood that within this thermal transition, there is a range of temperatures which the operator can select for the bed temperature setpoint. The selected temperature will affect the build properties during the SLS process. For example, a low temperature within the thermal transition range typically results in built part that is easier to remove from the cake bed. This is because there is relatively less melting of the powder prior fusing by the laser, thus areas adjacent to the sintered powder are less likely to stick together and adhere to the built part. Therefore, it is easier for the operator to remove the built part from the unfused powder in the cake bed.

Although a lower bed temperature setpoint may result in increased ease of part removal, it may also result in less accuracy in the part built. Thus, if a more accurate build is desired, the operator can increase the bed temperature setpoint, resulting in a built part with less deviation from the specified dimensions thereof. Such built parts, however, typically are more difficult to remove from the cake bed because the particles adjacent to the material sintered during the SLS process are more tightly adhered thereto, requiring additional effort to remove them.

In determining the bed temperature setpoint, the properties of the built part are considered. If, for example, in an application in which manufacturing efficiency is desired and part accuracy is less important, the operator may select a lower bed temperature setpoint within the thermal transition area. If however, greater part accuracy is desired, the operator can select a higher bed temperature setpoint within the thermal transition area. IT should be understood that the bed temperature may affect a multitude of parameters in the built part, and it is not limited to those expressly described herein.

Using the DSC analysis, it is possible for an operator to consistently select the correct bed temperature setpoint for a specific lot of powder of a sample to achieve the desired build properties. Typically, the build properties are referenced against the percentage of the sample that is melted. For example, it may be known that $T_{50}$ provides a part with certain build properties. This data is initially derived for a specific type of powder during a calibration process, which is described below. After the calibration data is known, an operator may apply the calibration data to a DSC analysis of a specific lot of powder to determine the correct bed temperature setpoint to achieve the desired build properties for that specific lot of powder (disclosed further below).

Figure 3:
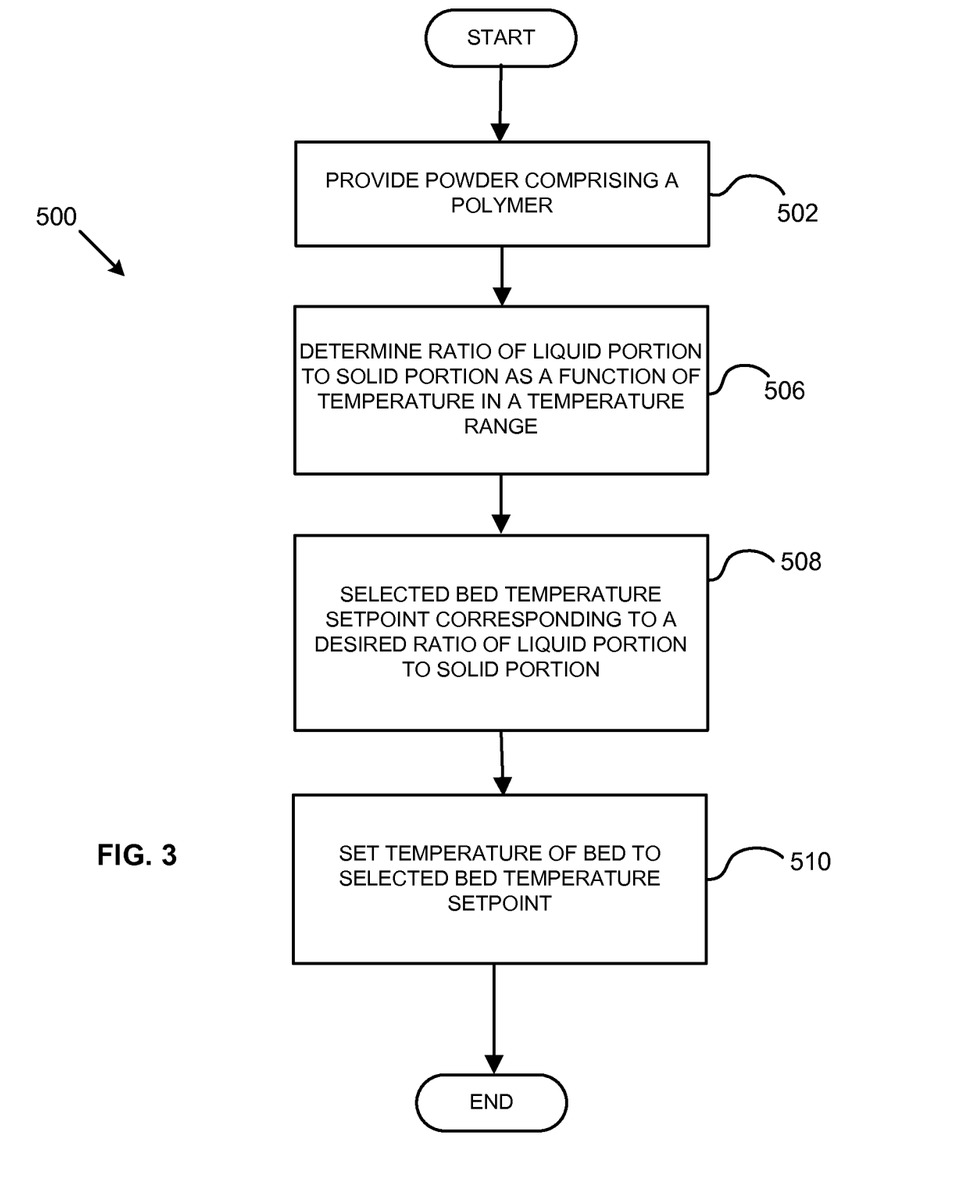
FIG. 3 illustrates a method in accordance with one embodiment of the present invention.

In reference to FIG. 3, a method in accordance with one embodiment of the present invention is illustrated. The method includes the steps of providing a powder comprising a polymer for use in a selective laser sintering machine 502. The method further includes the step of determining a ratio of a liquid portion of the powder to a solid portion of the powder as a function of temperature within a temperature range 506. The method further includes the step of selecting a bed temperature setpoint in the temperature range corresponding to a desired ratio of the liquid portion of the powder to the solid portion of the powder 508. The method further includes the step of setting the temperature of the bed to the selected bed temperature set point 510.

Calibration Process

Using the melt curve and ratio curve it is possible to determine a bed temperature setpoint for a specific lot of powder. The first step is to conduct a calibration process. The calibration process allows the operator identify at what point on the integration curve 130 a bed temperature setpoint will achieve certain desired build properties. Once the calibration data is known, it can be applied to a DSC analysis of a specific lot of powder to determine the correct bed temperature setpoint to achieve the desired build properties with that specific lot of powder. It should be understood that this calibration process is in initial step and does not require repeating for subsequent lots of powder. In some embodiments, calibration data of a first type of powder and can be used with a second type of powder to determine a bed temperature setpoint. It should also be understood that this calibration data may be created by a third party, for example a vendor, and be made available to a person operating an SLS machine. It should be understood further that the calibration step is used to aid in selection of a bed temperature setpoint that will result in a built part having certain build properties, but that it is not necessary to perform this calibration process.

The operator may begin the calibration process by selecting a specific polymer, for example 60/40 PEKK, and conducting a DSC analysis on a lot thereof to obtain data similar to that illustrated in the chart shown in FIG. 2. The operator then performs an SLS build using the powder in the tested lot. For the SLS build, the operator selects a bed temperature setpoint corresponding to a specific point on the ratio curve 230. For example, the operator may initially begin by selecting the 50% point 214 on the integration curve. The 50% point 214 on the integration curve corresponds to a temperature $T_{50}$. The operator conducts the SLS build using the lot of powder on which the DSC analysis was performed at a bed temperature setpoint $T_{50}$.

After the part is built, the operator removes the built part from the powder cake. In removing the part, the operator records the ease or difficulty or removing the part from the cake and associates this data with the ratio associated with 50% point 214. The operator then measures the accuracy of the built part and further associates this build accuracy data with the 50% point 214. The build accuracy can be measured by conducting a visual comparison between the built part and a standard part, for example, a drawing or a previously authenticated three dimensional part. In other embodiments, the accuracy of the built part can be measured by using one or more cameras to capture a three dimensional image of the built part. Data of this captured image can be compared to an original design using, for example, software executing on a computer. In this manner, the operator can determine the relative accuracy of built part at a bed temperature of $T_{50}$. In addition, the operator may measure any number of additional properties of the built part, including strength, ductility, fatigue, facture toughness, hardness, conductivity, tensile strength, etc.

The calibration process continues by performing SLS builds using bed temperature setpoints associated with points up and down the ratio curve 130. For each point, a bed temperature setpoint $T_{XX}$ is determined and an SLS build is conducted. The properties of each build are recorded and associated with the specific point on the integration curve. In this way, it is possible to build a library or database comprising a plurality of points along the integration curve and having build properties associated with each point. This calibration data can then be applied to DSC analysis performed on individual lots of powder, as further discussed below, to determine the correct bed temperature setpoint for that specific lot of powder and to achieve the desired build properties.

Typically, the operator will perform this calibration process on a type of powder, for example, 60/40 PEKK. After the calibration step is performed, the results of the calibration process can be used on different lots of that type of powder to determine the bed temperature setpoint that will achieve the desired results for that type of powder. It should also be understood that although a calibration process is disclosed it is not necessary to perform this calibration step. For example, an operator may desire to conduct SLS builds at a bed temperature setpoint in which 50% of the material is melted, regardless of the result build properties. Therefore, it is not necessary to build a library of different values. The operator can simply proceed, as further discussed below, to conduct a DSC analysis on a specific lot of powder and determine the correct bed temperature setpoint therefrom.

Determining Bed Temperature Setpoint

After the calibration data is obtained for a specific type of powder, for example 60/40 PEKK, the operator can apply this data to DSC analyses of specific lots of the 60/40 PEKK powder to determine the correct bed temperature setpoint to achieve the desired build properties for the 60/40 PEKK blend. It is also possible to apply the calibration data for the 60/40 blend to other types of polymers, and blends thereof, to determine the correct bed temperature setpoint.

In one example, the operator seeks to build parts from a lot of 60/40 PEKK powder. The operator first conducts a DSC analysis on a portion of the powder from that lot. The operator then determines the specific build properties that she desires in the parts to be built. Based on the desired build properties, the operator references the calibration data and determines what point on the integration curve, i.e. what percentage of melted material, will achieve the desired build properties. After the operator determines that specific point on the integration curve, for example YY, the operator references the DSC data for the specific lot of 60/40 powder and determines the temperature $T_{YY}$ associated with the point YY. $T_{YY}$ is thus the bed temperature setpoint that should be used with the specific lot of 60/40 powder to achieve the desired build properties.

As discussed above, in some embodiments of the present invention, it is not necessary to use calibration data. For example, it may be desired to conduct and SLS build with a layer of powder being 40% melted. In this scenario, a DSC analysis is conducted on the specific lot of powder. Based on this data, the operator determines the temperature $T_{40}$ associated with the point at which 40% of the powder is melted. This is the bed temperature setpoint that the operator will run the SLS machine for the build. If, for example, it is desired to build using a different lot of 60/40 PEKK powder, a DSC analysis of that subsequent lot is performed and a new $T_{40}$ is determined. This is particularly useful when working with new blends of powder, powders having several types of different powders, powders including additives, and recycled powder blends. In such cases, the melting point of the powders, and result bed temperature setpoint, can vary. By using the method in accordance with the present invention, it is possible analytically determine the correct temperature.

In some embodiments of the present invention, a computer is in communication with the SLS machine, for example, a controller associated with the SLS machine. The controller may further include calibration data associated therewith. During a build using the SLS machine an operator may input certain parameters into the build machine, for example the build properties, the specific type of powder, and DSC data regarding the specific type of powder. Software executing on the computer determines a bed temperature setpoint based on the data input into the controller and sets the bed temperature thereto. In yet further embodiments of the present invention, the SLS machine includes a DSC device associated therewith. The DSC device performs periodic analysis on the powder being used by the SLS machine and periodically adjusts the bed temperature based on the results of the analysis, the desired build properties, and the type of powder, among other possible variables.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for determining a bed temperature setpoint for use with a powder in a selective laser sintering machine, comprising the steps of:
    providing a powder comprising a polymer for use in a selective laser sintering machine;
    determining a melt curve for the powder in a temperature range, the melt curve representing the energy required to increase the temperature of the powder in the temperature range using differential scanning calorimetry;
    determining a second curve representing a ratio of a liquid portion of the powder to a solid portion of the powder as a function of temperature within the temperature range based on the melt curve determined using differential scanning calorimetry;
    identifying a desired ratio of the liquid portion of the powder to the solid portion of the powder for a build using the selective laser sintering machine;
    selecting a bed temperature setpoint in the temperature range by selecting the temperature that corresponds to the desired ratio in the second curve.

2. The method of claim 1, further comprising the steps of:
    providing a selective laser sintering machine having a bed with a variable temperature control;
    setting a temperature of the bed to the selected bed temperature setpoint;
    building a part from the powder using the selective laser sintering machine.

3. The method of claim 1, further comprising the step of:
    selecting the desired ratio by referencing a library comprising data associated with a plurality of parts made using a standard powder with a selective laser sintering machine, each said part being made using a different bed temperature setpoint, each bed temperature setpoint corresponding to a different ratio of a liquid portion of the powder to a solid portion of the powder.

4. The method of claim 1, wherein the standard powder comprises a polymer, and the standard powder is different than the powder for which the desired ratio is being selected.

5. The method of claim 4, wherein the library comprises accuracy data corresponding to an accuracy of the part relative to a design used to make the part.

6. The method of claim 4, wherein the library comprises removal data corresponding to the ease or difficulty of removing the part from a powder cake surrounding the part.

7. A method for determining a bed temperature setpoint for use with a powder in a selective laser sintering machine, comprising the steps of:
    providing a powder comprising one or more of polyetheretherketone ("PEEK"), polyetherketoneketone ("PEKK"), polyetherketone ("PEK"), polyetheretherketoneketone ("PEEKK"), or polyetherketoneetherketoneketone ("PEKEKK");
    determining a melt curve for the powder in a temperature range, the melt curve representing the energy required to increase the temperature of the powder in the temperature range using differential scanning calorimetry;
    determining a second curve representing a ratio of a liquid portion of the powder to a solid portion of the powder as a function of temperature within the temperature range based on the melt curve determined using differential scanning calorimetry;
    identifying a desired ratio of the liquid portion of the powder to the solid portion of the powder for a build using the selective laser sintering machine;
    selecting a bed temperature setpoint in the temperature range by selecting the temperature that corresponds to the desired ratio in the second curve.

8. The method of claim 7, further comprising the steps of:
    providing a selective laser sintering machine having a bed with a variable temperature control;
    setting a temperature of the bed to the selected bed temperature setpoint;
    building a part from the powder using the selective laser sintering machine.

9. The method of claim 8, wherein the powder comprises recycled PEKK.

10. The method of claim 9, wherein the powder comprises virgin PEKK.

11. The method of claim 7, further comprising the step of:
    selecting the desired ratio by referencing a library comprising data associated with a plurality of parts made using a powder comprising virgin PEKK and excluding recycled PEKK with a selective laser sintering machine, each said part being made using a different bed temperature setpoint, each bed temperature setpoint corresponding to a different ratio of a liquid portion of the powder to a solid portion of the powder.

* * * * *